United States Patent Office.

DAVID S. WOOD, OF TISKILWA, ILLINOIS.

Letters Patent No. 106,643, dated August 23, 1870.

IMPROVEMENT IN COMBINATION OF OCHERS FOR PAINT.

The Schedule referred to in these Letters Patent and making part of the same.

*To all whom it may concern:*

Be it known that I, DAVID S. WOOD, of Tiskilwa, in the county of Bureau and State of Illinois, have discovered and compounded a useful Improvement in Umber Colors; and I do hereby declare that the following is a full and exact description thereof, which will enable those skilled in the art to make and use the same, reference being had to the following named ingredients, their component parts, and how they are compounded.

Turkey umber, the article now generally used for coloring, is composed of silica, alumina, oxide of iron, manganese, and water, all of which are found in one bed in the condition known as raw umber in the United States.

The object of the present invention is to produce a similar umber, and equally as good, by combining terra sienna, found in the United States; as, for instance, in Bureau county, in the State of Illinois.

The earthy substance found there is not combined in a state of nature like the umber found in Turkey, but lies in strata of different distinct colors. In one stratum is found yellow sienna, in another black sienna, and in a third a purplish-red sienna, any one of which contains, as found by analysis, all of the elements of Turkish umber, the difference consisting in the state which the oxide of iron is in. When the yellow is properly burned it becomes red, the purplish-red becomes darker red, the black turns blacker. Now, these umbers are useless in market as umbers unless combined; and, in order to make umber equal to the best in use and of a similar shade, I add to one part of black sienna about one-fourth part of red. To make Vandyke-brown, add one part of red to seven parts of black. Raw umber is composed of about two parts of black to one part of yellow. No positive proportion, however, can be given, as the colors in the strata in some instances, vary. The artist, however, can get the desired shade as readily as in other colors.

The above formula has been given so as to produce two well-known colors, but, by changing the proportions, a variety of dark colors may be obtained for graining, shading, &c., similar to foreign umbers now in market in this country.

*Claim.*

An umber compounded and prepared from the various colors set forth.

DAVID S. WOOD.

Witnesses:
E. E. GIBSON,
G. L. CHAPIN.